United States Patent [19]

Edelstein et al.

[11] Patent Number: 4,685,512

[45] Date of Patent: Aug. 11, 1987

[54] CAPILLARY-PUMPED HEAT TRANSFER PANEL AND SYSTEM

[75] Inventors: Fred Edelstein, Hauppauge; Robert A. Haslett, Dix Hills; Robert L. Kosson, Massapequa; William Harwell, Coram, all of N.Y.

[73] Assignee: Grumman Aerospace Corporation, Bethpage, N.Y.

[21] Appl. No.: 889,012

[22] Filed: Jul. 24, 1986

Related U.S. Application Data

[62] Division of Ser. No. 360,321, Mar. 22, 1982, Pat. No. 4,602,679.

[51] Int. Cl.$^4$ .............................................. F28D 15/00
[52] U.S. Cl. .......................... 165/104.14; 165/104.26; 361/385
[58] Field of Search ...................... 165/104.14, 104.26, 165/104.33; 361/385

[56] References Cited

U.S. PATENT DOCUMENTS 3,913,665 10/1975 Franklin et al. ................. 165/104.26

*Primary Examiner*—Albert W. Davis, Jr.
*Attorney, Agent, or Firm*—Richard G. Geib

[57] ABSTRACT

A thermal management system using heat pipe principles and incorporating capillary-pumped equipment mounting panels such that a heat transport loop without moving parts is provided. The panels can function to either absorb heat or to reject heat and can interface with heat generating equipment or heat radiators. Each panel comprises a pair of coextensive flat plates bonded together with a thin, fine-pore sheet wick interposed therebetween. A network of liquid grooves in one plate is in fluid communication with the sheet wick which covers the grooves and most of the plate and a separate liquid line connecting the panels. A network of vapor channels in the other plate is in fluid communication with the wick and with a separate vapor line connecting the panels. The vapor channel networks of the panels and the liquid groove networks of the panels are connected such that the panels are arranged in parallel in the fluid circuit or loop. A heat input into panels in the loop causes evaporation of liquid off the surface of the sheet wick. Vapor from the evaporated liquid is circulated to panels serving as cold sinks where the vapor is condensed. Capillary action of the wicks returns the condensate to the panels being heated where the cycle is repeated.

1 Claim, 4 Drawing Figures

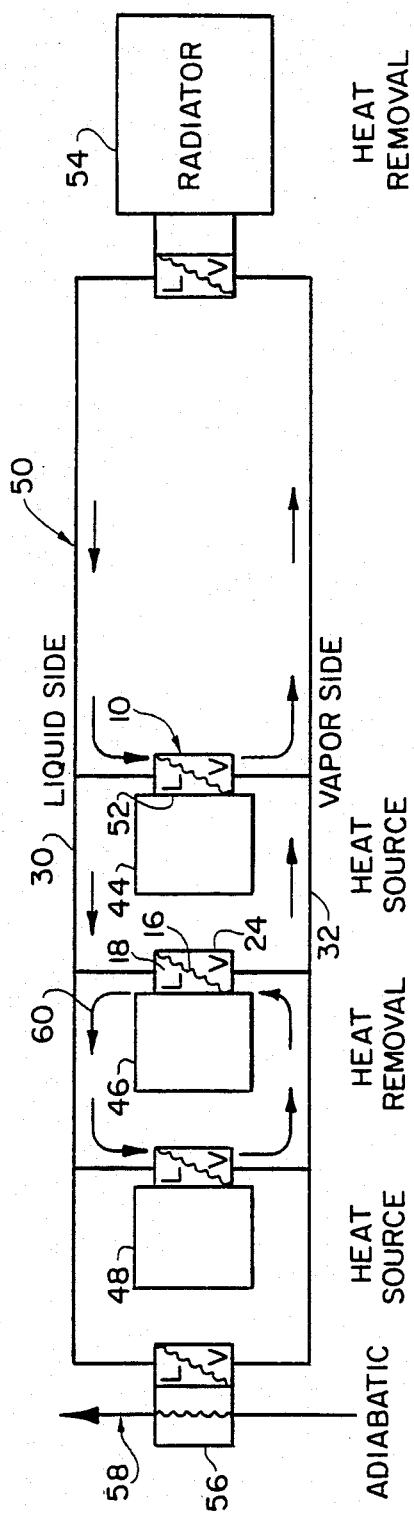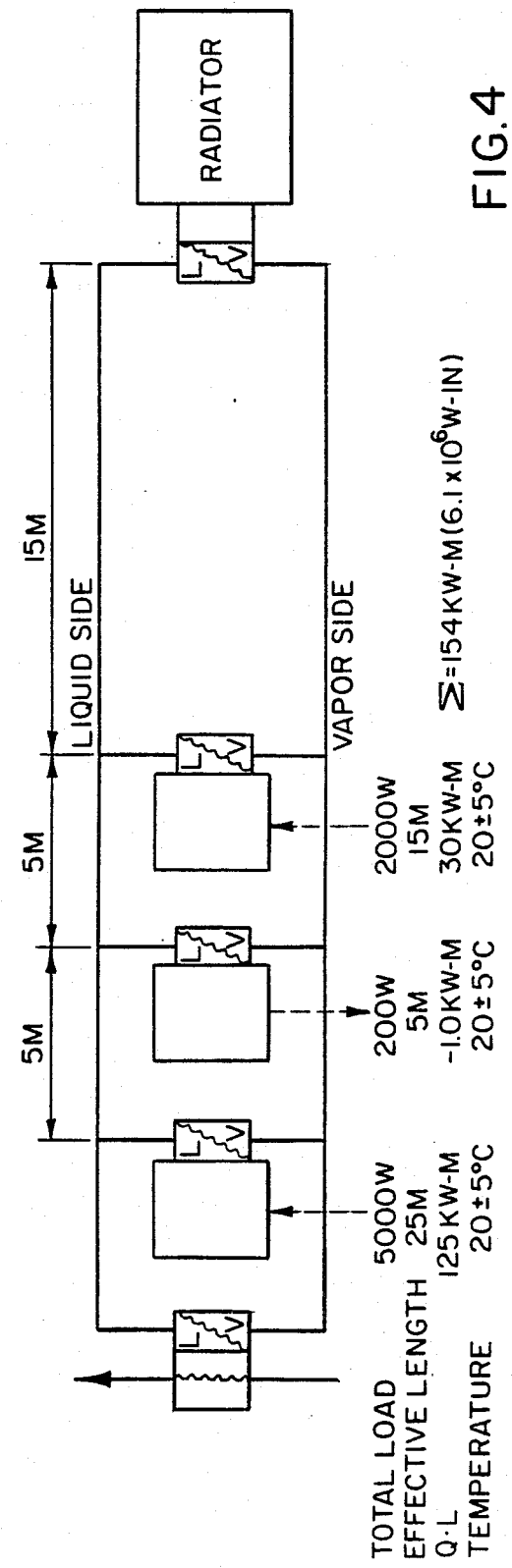

CAPILLARY-PUMPED HEAT TRANSFER PANEL AND SYSTEM

This is a division of application Ser. No. 360,321, filed Mar. 22, 1982, now U.S. Pat. No. 4,602,679, granted July 29, 1986.

BACKGROUND OF THE INVENTION

1. Field Of The Invention

This invention relates to thermal management systems and, in particular, to a two-phase heat transfer system using heat pipe principles and to capillary-pumped equipment mounting panels employed therewith.

2. Description Of The Prior Art.

In current space activities, the very large, long-life space systems presently being planned are based on the large lift capabilities of the U.S. Space Shuttle. These large satellites and other space projects will require thermal management systems with multikilowatt capacity capable of collecting and transporting heat from various subsystems to heat rejection radiators. Transport distances are expected to be on the order of 10 to 30 meters. Current technology for large thermal transport systems is based on circulating liquid loops. These tend to be heavy and vulnerable to micrometeoroid puncture, have relatively low thermal performance (film coefficients), and require significant amounts of pump power. As current demonstrated pump life is only $2\frac{1}{2}$ years, the pumps and the required valves also lower system reliability. Many problems inherent in thermal systems using a circulating liquid can be alleviated by using a capillary-pumped two-phase circulating system. Liquid delivered to the mounting panels on which heat generating equipment is fixed would pick up heat by evaporation. The vapor would be delivered to heat sinks, yielding heat by condensation. Compared to circulating liquid systems, mass flow rates and liquid line sizes would be reduced, film coefficients would be higher, and pump power would be eliminated.

Capillary pumped heat pipe systems are, of course, well known in the prior art both for ground-based and for space applications. In the prior art, also, J. T. Pogson et al. (U.S. Pat. No. 4,040,478) teach that it is known to provide heat pipe systems having separate evaporators and condensers connected for fluid communication therebetween by individual liquid and vapor lines. However, they do not provide a teaching of a system with an equipment mounting panel construction having a sheet wick in the panel interposed between the liquid grooves and the vapor channels therein such that a high capillary pressure for efficient fluid circulation in a heat pipe system is attainable.

There is a teaching by W. P. Peck (U.S. Pat. No. 3,803,688) of a heat pipe having an integral "screen wick" between the liquid capillary grooves and the vapor space of the device. Although the construction has a superficial resemblance to the panel design of the present invention, Peck provides capillary grooves for the required fluid circulation therealong and the screen wick disclosed therein does not act as a capillary pumping means as in the present invention but merely serves a vapor venting function. In addition, unlike Peck, the grooves of the present invention cover only a small fraction of the heat transfer surface, and the porous wicking which covers both the grooves and the remainder of the surface serves to draw liquid in a direction transverse to the groove axis to completely wet the surface. Evaporation occurs at the meniscus at the liquid-vapor interface near the exposed surface of the porous wicking.

SUMMARY OF THE INVENTION

This invention is a thermal management system incorporating capillary-pumped panels using heat pipe principles such that a heat transport loop without moving parts is provided. In this system, the capillary pumped panel means serve both as a heat emitting equipment mounting means and also as the fluid circulating pumping means. The panel means can function as either heat absorbers or heat rejectors in the fluid circuit or loop. To minimize viscous flow pressure loss, the interconnections between the panel means and the heat dissipating radiators of the system are by means of separate liquid and vapor tubes or lines.

The panel means comprise a pair of flat coextensive plates fastened one on the other. A network of liquid grooves is provided in the faying surface of one plate and the channels and most of the plate surface are covered with a thin fine-pored sheet wick. A network of vapor channels is provided in the faying surface of the other plate and the two plates are joined together in a hermetic relationship. Fluid communication between the liquid grooves and the vapor channels is through the sheet wick. Each panel of the system has manifolding joining the vapor channel network to the separate vapor lines and the liquid groove network to the separate liquid lines of the heat transferring loops of the system. The vapor channel networks of the panels are connected to one another and the liquid groove networks of the panels are connected to one another such that the panels are connected in parallel in the fluid circuit. Heat emitting equipment is mounted on the panel preferably on the side having the plate with the liquid groove network such that the heat input evaporates the liquid on the surface of the sheet wick. The evaporated liquid passes into the vapor channels and is circulated through the vapor lines to a panel acting as a heat rejector. Vapor condensed in the rejector (condenser) panel is collected and returned by the capillary action of the sheet wicks in the heat source (evaporator) panels and is returned as a liquid through the liquid line to the panel from whence it was evaporated and the cycle is repeated.

It is thus a principal object of the invention to provide a thermal management system having capillary pumped fluid circulation such that waste heat collected from various sources is transported to radiators or other heat sinks for rejection into ambient space without a requirement for mechanical pumps or other moving parts.

It is another object to provide a thermal management system incorporating capillary-pumped equipment mounting means in which a very thin, very fine pore sheet wick is used for pumping such that the short liquid flow path through the wick results in small viscous flow losses and the fine pore structure of the wick results in a high capillary pressure difference.

It is a further object to provide a thermal management system incorporating capillary-pumped equipment mounting panel means using heat pipe principles in which a very thin porous wicking is provided on the evaporator surfaces to produce a small evaporator temperature drop and a high nucleate boiling heat flux limit and in which a network of grooves or channels is provided to feed the wicking such that the liquid flow path resistance therein is reduced.

Yet another object is to provide a two-phase, capillary-pumped thermal management system in which separate tubular liquid and vapor lines are used in the circulation of liquid and vapor in the system to minimize viscous flow pressure loss.

A yet further object is to provide a thermal management system having no moving parts and which has panel elements for mounting equipment, each panel of which acts as a combination high efficiency heat source or sink and pump module replacing conventional fluid pumps.

Still another object of the invention is to provide a thermal management system having a large capacity two-phase heat transport loop that provides temperature control for widely spaced and thermally diverse instruments and payloads mounted on large space platforms and in which loop temperature is isothermal and is not dependent on heat-emitting instrument arrangement and heat dissipation.

Another object of the invention is to provide a thermal management system which avoids the problems associated with single-phase fluid systems such as the requirement for mechanical pumps and associated equipment with the high power consumption, leakage, cost, redundancy, and vibration effects attendant thereupon. Other objects and advantages of the present invention will become apparent from the figures and specifications which follow.

DESCRIPTION OF THE DRAWINGS

For the purpose of illustrating the invention, there is shown in the drawings the forms which are presently preferred; it should be understood, however, that the invention is not necessarily limited to the precise instrumentalities and arrangements here shown.

FIG. 3 is a diagrammatic representation of the thermal management system of the invention; and FIG. 4 is a diagrammatic representation of the thermal management system of FIG. 3 indicating typical system parameters.

DESCRIPTION OF THE PREFERRED EMBODIMENT

Figure 1:
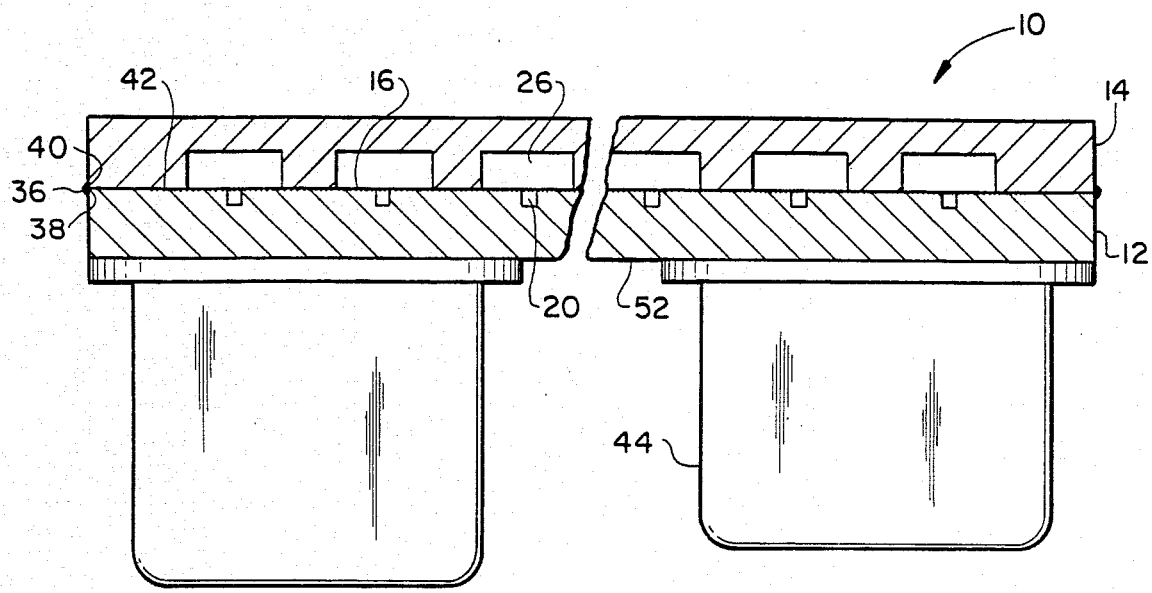
FIG. 1 is a side view partially in section of the capillary-pumped panel of the invention with instruments mounted on one side thereof.
Figure 2:
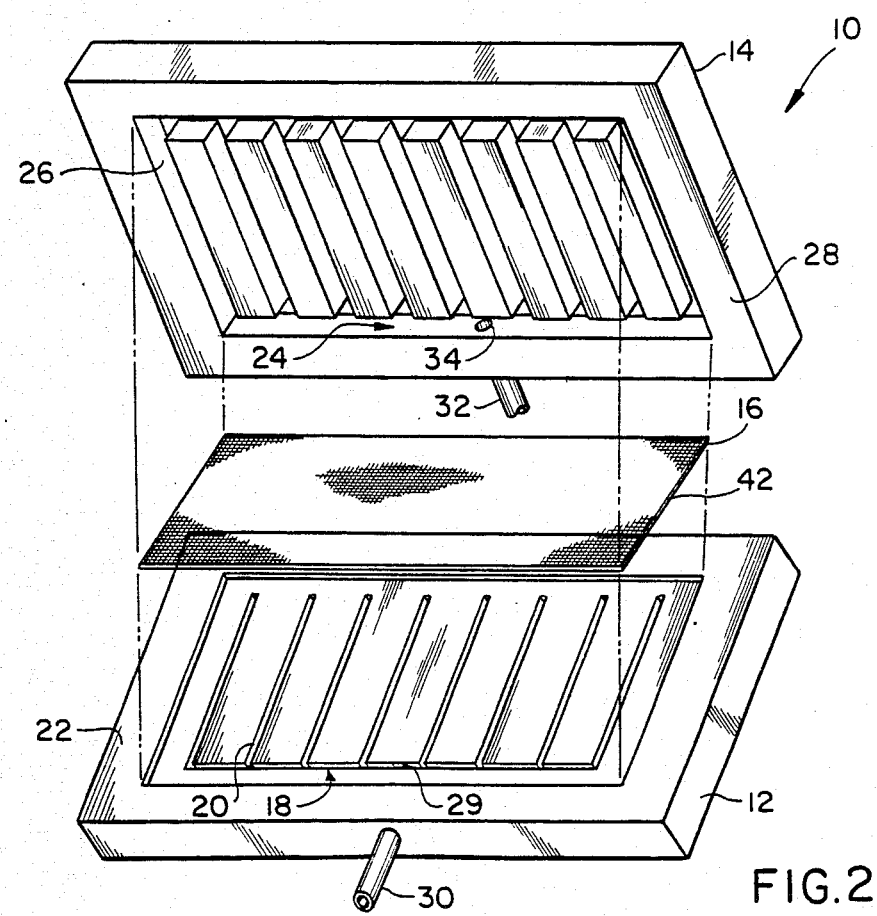
FIG. 2 is an exploded view of the capillary-pumped panel of the invention.

With reference now to the drawings, FIGS. 1 and 2 show details of construction of the capillary-pumped panel 10 of the invention. Panel 10 comprises first and second flat coextensive plates, 12 and 14 respectively fastened together with a sheet wick 16 interposed therebetween. Plates 12 and 14 can be fabricated out of any suitable thermally conductive material such as aluminum or copper. A network 18 of narrow grooves 20 is provided in the faying surface 22 of plate 12 to feed the sheet wick which covers the grooves and most of the plate surface. A network 24 of channels 26 is provided in the faying surface 28 of plate 14. Groove network 18 is in fluid communication by means of a suitable manifold or port means 29 with a liquid line 30 and the channel network 24 is in fluid communication with a vapor line 32 by means of a suitable manifold or port means 34. Sheet wick 16 can be fabricated out of any suitable thin heat pipe wicking material, but a very thin feltmetal sheet having a very fine pore size is preferred. When the panel 10 is assembled, the network 18 of liquid grooves is covered with the wick 16 and the faying surfaces 22 and 28 of the plates are bonded together or are otherwise hermetically sealed together as by means of a weld 36 around the adjoining edges 38 and 40 of the plates. To assure a proper capillary action, the peripheral edge 42 of the sheet wick extends outwardly on all sides beyond the perimeter of the groove and channel networks.

It will be recognized that the various dimensional and design parameters of the panel 10 and of its associated equipment such as the liquid and vapor lines or tubing 30 and 32 will be governed by the environment of use and the temperature range within which the system will operate. Typically, however, the panel 10 will be less than about one-half inch (13 mm) thick, the liquid grooves will be about 0.063 in (1.6 mm) wide and 0.063 in (1.6 mm) deep and the groove network 18 will have a groove spacing of about 0.5 in (13 mm).

FIG. 3 illustrates diagrammatically panel 10 used in a heat transfer loop 50 of a heat management system. In the representation of panel 10 therein, the diagonal wavy line represents the sheet wick 16, the section labeled "L" represents the liquid groove network 18, and the section labeled "V" represents the vapor channel network 24. Heat emitting equipment such as instruments 44, 46, and 48 whose temperature it is desired to control are mounted on the surface 52 of the panel. To form the heat transfer loop 50, the panels 10 are arranged in parallel with the liquid lines 30 and the liquid groove networks 18 of the panels connected together and the vapor lines 32 and the vapor channel networks 24 of the panels connected together. The loop is connected in a heat exchange relationship with a radiator 54 and it can be connected to a heat exchanger 56 of another heat transfer loop 58.

The loop is readied for operation by installing an appropriate quantity of heat pipe working fluid, typically Freon, ammonia, or water (not shown), generally until the liquid channels and sheet wicks of the panels are saturated, and the loop is hermetically sealed in accordance with normal practice. Because of the provision of the network 18 of liquid grooves 20 in the panels the liquid flow path in the porous metal sheet wick 16 is shortened. The short flow path is desirable because the sheet wich must be kept thin to prevent nucleate boiling under high heat flux conditions ($>2$ watts/cm$^2$), and the combination of small cross-sectional flow area and low wick permeability would otherwise result in excessive liquid pressure losses.

In operation, a heat input, such as from a heat emitting instrument, into a panel 10 causes an evaporation of liquid at the meniscus at the liquid-vapor interface near the exposed surface of its sheet wick 16. Vapor from the evaporated liquid passes from the vapor channel network 24 and from thence into vapor line 32 where it is conveyed to the panel associated with the radiator 54. If heat transfer loop 58 is in a heat extraction mode, vapor will also flow to the panel associated with heat exchanger 56. The condition in which heat transfer loop 58 is shut off and an instrument 46 is temporarily off such that its associated panel is acting as a cold sink is illustrated in FIG. 3. As indicated by arrows 60, vapor from the panel associated with heat emitting instrument 48 flows both to the panel associated with inactive instrument 46 and to the radiator 54 panel and vapor from the panel associated with instrument 44 flows to the panel associated with radiator 54. Vapor condensed in the panels associated with the radiator 54 and instrument 46 is pumped by the wick 16 in each of those panels through liquid line 30 to the panels associated with heat emitting instruments 44 and 48 where capillary action results in the saturation of the wicks of the panels. A continued heat input into the panels causes a vaporization of the liquid at the surface of the sheet wick and the cycle is repeated.

A diagrammatic representation of usual system parameters for a typical thermal management system for a very large space system having heat transport distances of up to 25 meters is shown in FIG. 4.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict outselves to the particular constructions described and illustrated, but desire to avail outselves of all modifications that may fall within the scope of the appended claims.

Having thus described our invention, what we claim is:

1. A thermal management system comprising a plurality of capillary-pumped panels arranged in parallel in a heat transfer circuit, said panels each comprising first and second coextensive flat planar plates sealed together with a thin, fine-pore sheet wick interposed therebetween, a vapor channel network and an associated network of liquid grooves in the faying surfaces of said first and second plates of each of said panels in fluid communication with one another through said wick, said wick having isotropic porosity such that liquid is drawn transverse to the axis of said liquid grooves on either side thereof to completely wet the wick exposed to said vapor channels, dedicated vapor lines outside said panels connecting said vapor channel networks of each panel with one another for the circulation of vapor therebetween, dedicated liquid lines outside said panels connecting said liquid groove network of each panel with one another for the circulation of liquid therebetween, said circuit being charged with a heat pipe working fluid, said panels mounting equipment in a heat transfer relationship therewith, heat emitting equipment mounted on at least one of said panels, heat removing equipment mounted on at least one other of said panels, whereby a heat input into a number of said panels causes a vaporization of fluid from said wicks therein on the surface thereof facing the vapor channel network and the removal of heat from another of said panels causes a condensation of fluid therein such that a circulation of fluid by the capillary pumping of said wicks that serves to transport heat between widely spaced panels in said circuit is provided.

* * * * *